United States Patent

[11] 3,621,986

| [72] | Inventors | Joseph H. Webb<br>26957 Russell Road;<br>Donald G. Stiles, 29682 West Oakland<br>Road, both of Bay Village, Ohio 44140 |
|---|---|---|
| [21] | Appl. No. | 821,885 |
| [22] | Filed | May 5, 1969 |
| [45] | Patented | Nov. 23, 1971 |

[54] CONVEYOR APPARATUS
8 Claims, 5 Drawing Figs.

[52] U.S. Cl. ................................................ 198/195
[51] Int. Cl. ..................................................... B65g 15/30
[50] Field of Search ......................................... 198/195, 196, 189, 203

[56] References Cited
UNITED STATES PATENTS

| 2,994,518 | 8/1961 | Crans | 198/203 |
| 1,653,741 | 12/1927 | Solem | 198/195 |
| 2,989,169 | 6/1961 | Clapp | 198/196 |
| 3,021,939 | 2/1962 | Hopkins | 198/195 |
| 3,311,222 | 3/1967 | Crawford | 198/196 |

Primary Examiner—Richard E. Aegerter
Attorney—Teare, Teare & Sammon

ABSTRACT: A conveyor apparatus including a frame, a conveyor mounted on the frame and a drive mechanism for moving the conveyor on the frame. The conveyor includes an endless conveyor member having a plurality of slat members disposed in side-by-side relation which provide inner and outer reach portions, a plurality of rotatable members mounted on the frame to rollingly support the outer reach portion and a slide support member is carried by the frame for slidably supporting the inner reach portion. The drive mechanism includes one or more flexible, endless drive elements operably connected to the outer reach portion for moving the conveyor member with respect to the frame.

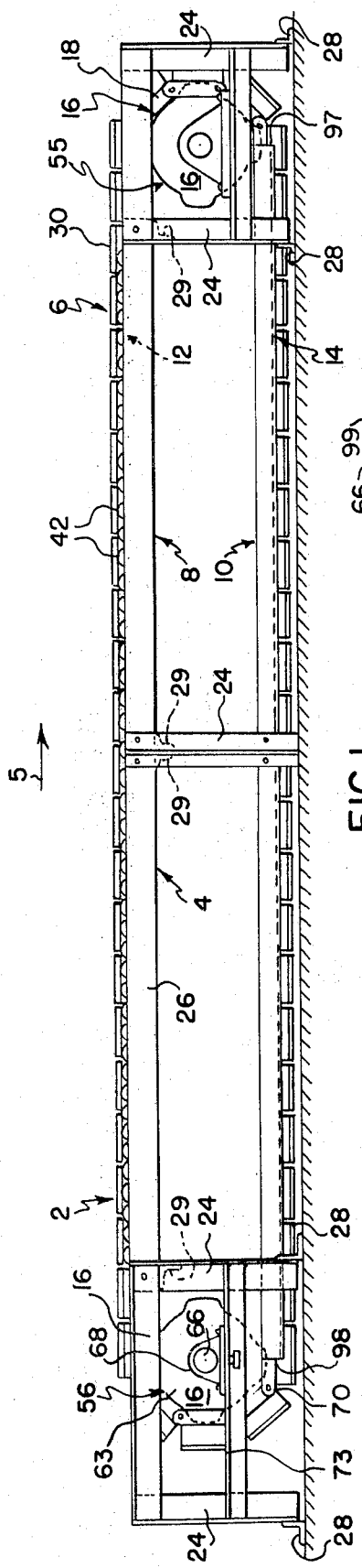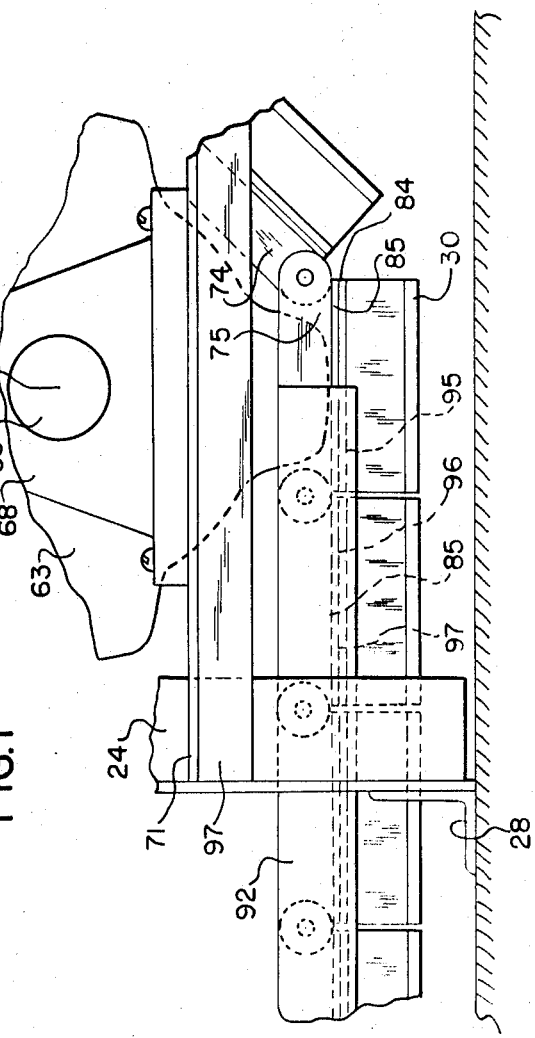

CONVEYOR APPARATUS

BACKGROUND OF THE INVENTION

The present invention relates to conveyor apparatus, and more particularly to conveyors of the type which are formed of a plurality of laterally spaced support or slat members for supporting articles to be conveyed thereon.

Heretofore, the previously known slat-type conveyors employing a plurality of interconnected metal channel or wood slats were assembled to and supported by two strands of roller chain. Usually the chains were located beyond the ends of the slats, requiring a cover that made an objectionable dead space on each outer edge of the conveyor. Efforts to overcome this objection, by locating the roller chains under the ends of the slats, generated another problem by permitting small parts to fall between the slats and onto the chain track when they would wedge under the chain rollers. This would cause the rollers to slide on the tracks so that they eventually became flat and refused to roll. The sliding chains increased the chain pull beyond the design torque rating of the head shaft creating a torsional spring action that resulted in objectionable jerky operation.

SUMMARY OF THE INVENTION

The present invention contemplates the provision of a conveyor apparatus which comprises a frame and a conveyor member mounted for lengthwise movement on said frame. The conveyor member is of a generally elongated looplike construction having inner and outer reach portions and includes a plurality of support members disposed in side-by-side relation along the lengthwise dimension of said conveyor member. Rotatable means are mounted on the frame and are disposed for rollingly supporting the outer reach portion of the conveyor member. The rotatable means includes a plurality of roller members having their axes of rotation extending generally transversely to the general direction of movement of the conveyor member with the transverse distance between the respective axes of adjacent roller members being less than the transverse width of the respective support members. A slide means is mounted on the frame and is disposed for slidably supporting the inner reach portion in spaced, suspended relation on the frame and with respect to the outer reach portion. A drive mechanism including at least one flexible, endless drive element is carried by the frame and is operably connected to the outer reach portion for moving the conveyor member in a lengthwise direction with respect to the frame. In one form, the conveyor member projects laterally outwardly from its opposed sides and into overlying relation with respect to the drive mechanism.

By the foregoing arrangement, there is provided a novel and improved construction for a conveyor apparatus which is efficient and easily and accurately controllable for conveying articles of varying size and/or shape and with a minimum expense and maintenance. By the invention, a conveyor apparatus is provided wherein the pull on the drive and idler shafts is substantially reduced and the dead space areas in the construction are minimized. In addition, by the construction of the present invention there is provided a conveyor apparatus which enables relatively close and precise spacing between adjacent of the supporting slat members so as to prevent the falling through and/or wedging of small parts therebetween. Furthermore, the construction of the present invention also greatly reduces the friction forces and hence, the load forces on the drive mechanism which was a problem attendant in previously known slat-type conveyors.

BRIEF DESCRIPTION OF THE DRAWINGS

FIG. 1 is a side elevation view of the conveyor apparatus of the present invention;

FIG. 5 is an enlarged fragmentary view showing a portion of the drive mechanism removed from the assembly of FIG. 3.

DESCRIPTION OF THE PREFERRED EMBODIMENTS

Figure 3:
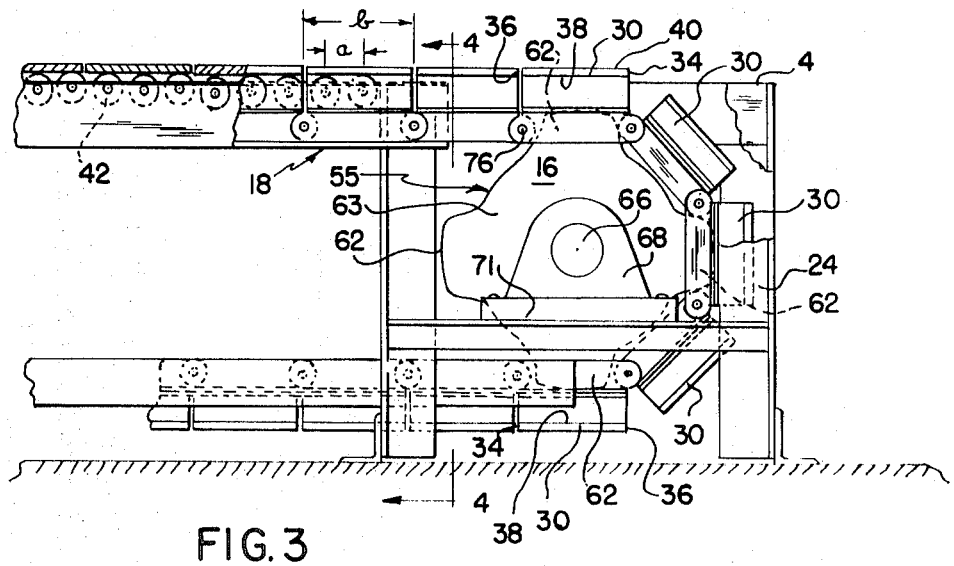

The conveyor apparatus of the present invention, illustrated generally at 2 in FIG. 1, is adapted for transporting articles, such as boxes, cartons or the like. In the preferred form, the conveyor apparatus comprises a frame 4 on which an endless conveyor member 6 is installed for lengthwise movement thereof, such as clockwise, as indicated by the arrow 5. The conveyor member 6 includes an upper or outer reach on which the transported articles are carried, as at 8, and a lower or inner reach, such as at 10. A rotatable support means 12 is carried by the frame 4 and is disposed for rolling supporting engagement with the outer reach 8. A slide support means 14 is carried by the frame 4 adapted to support the inner reach 10 in sliding relation thereon. The conveyor member 6 is supported at its opposed ends by a drive mechanism 16 which includes at least one flexible drive element, as at 18, for driving the conveyor member 6 lengthwise along the frame 4.

In the form shown, the frame 4 is of a generally open boxlike construction including a plurality of oppositely disposed pairs of upright support posts 24 which define the opposed sidewalls. The posts 24 may be supported at their upper ends in laterally spaced relation by generally lengthwise extending support bars, such as at 26. The bars 26 may be affixed thereto in any suitable manner, such as by welding, riveting or the like. The lower ends of the respective posts 24 may be connected, such as by welding or the like, to the floor by shortened angle bars, as at 28, to prevent shifting of the conveyor upon operation thereof. The thus formed sidewalls may be supported in generally parallel spaced relation adjacent the upper ends by transversely extending cross piece members 29 (FIG. 4) which may be disposed below the lengthwise extending bars 26 and secured thereto, and to the respective opposed upright bars 24 in any suitable manner, such as by welding or the like.

Figure 2:
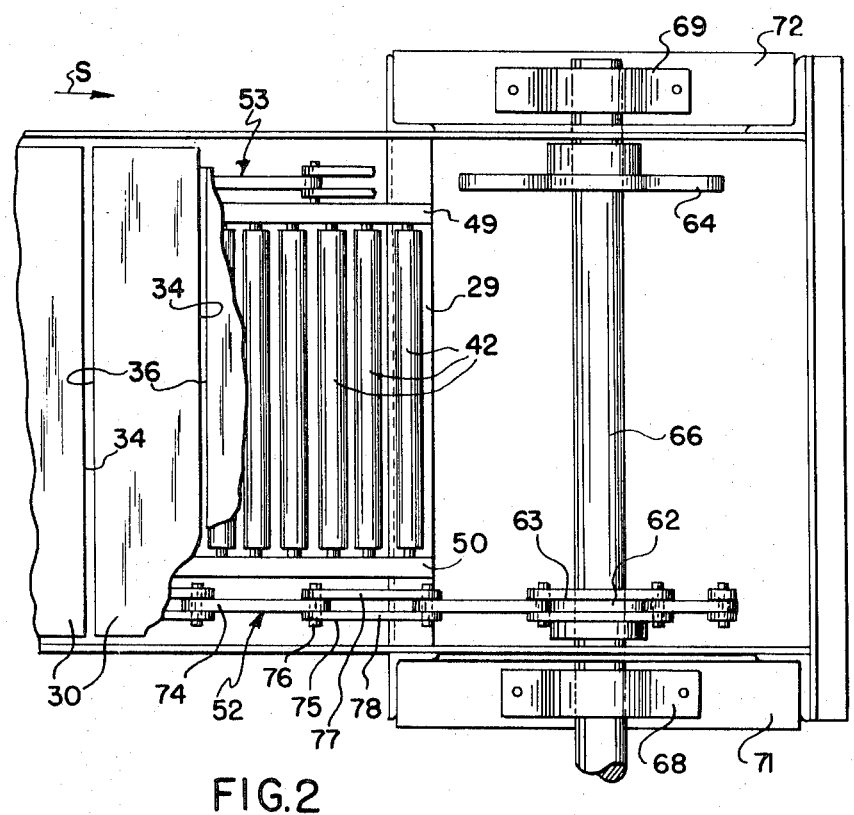
FIG. 2 is a fragmentary, enlarged top plan view looking down on the drive end section of the conveyor apparatus of FIG. 3 is a fragmentary side elevation view, partly in section, of the drive end section of the conveyor apparatus shown in FIG. 2.
Figure 4:
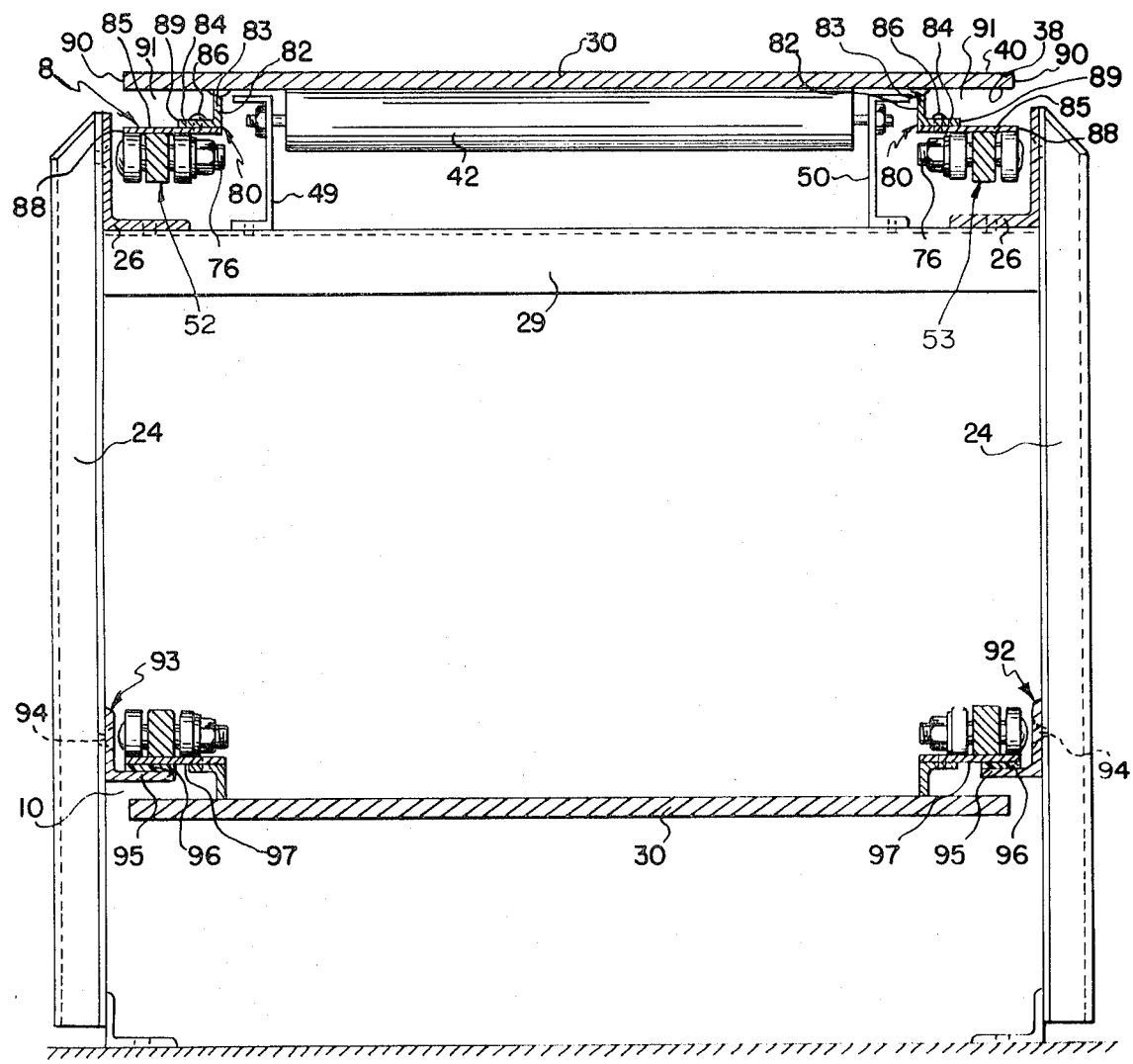
FIG. 4 is an enlarged vertical section view taken along the line 4—4 of FIG. 3.

As shown in FIGS. 1 and 2, the conveyor member 6 is of a generally looplike construction and preferably includes a plurality of laterally spaced elongated panels or slat members, such as at 30, which may be disposed in generally horizontal side-by-side relation along the lengthwise dimension of the frame 4. Preferably, each of the slat members 30 is of a generally rectangular configuration (FIG. 2) having substantially parallel leading and trailing edges 34 and 36, respectively. As shown in FIGS. 3 and 4, the slat members 30 are of a substantially flat, uniform thickness having generally planar interior and exterior surfaces 38 and 40, respectively, with the respective exterior surfaces 38 of each of the slat members 30 being disposed in generally parallel aligned relation with respect to one another when forming a part of either the outer reach 8 or the inner reach 10. In this manner, a substantially flat surface is provided for supporting articles as they move along the conveyor apparatus. Preferably, the lengthwise axis of the slat members 30 are disposed transversely, such as perpendicular to the direction of movement of the conveyor member 6 (FIG. 2).

To support the conveyor member 6 on the frame and to provide relative movement of the same with respect thereto, a rotatable support means is provided, illustrated generally at 12 (FIGS. 2 and 3), comprising a plurality of elongated roller members 42 which are carried by the frame. Preferably, the rollers 42 are journaled for rotation at their opposed ends to a pair of laterally extending oppositely disposed channel members 49 and 50 (FIG. 4), which are supported by and extend upwardly from the crosspiece members 29. As show, each of and may be made of any suitable material, such as plastic, wood, metal, rubber or the like. As shown, the channel members 49 and 50 extend in generally parallel relation lengthwise of the frame so that the central longitudinal axis of each of the respective roller members 42 extends generally transversely, such as perpendicular to the direction of movement of the conveyor member 6, and therefore, generally parallel with respect to the lengthwise axis of the respective slat members 30. In addition, the uppermost extent of the exterior surface of the roller members 42 (FIG. 3) project slightly above the upper ends of the respective channel members 49 and 50 so that the roller members 42 will engage the interior sides 38 of the slat members as they move along the outer reach 8 to enable the slat members to roll freely and unobstructed there along. As shown in FIG. 1, the transverse dimension, such as at $a$ (FIG. 3) between the longitudinal central axis of adjacent of the respective roller members 42 is less than the transverse width, such as at $b$, of the respective slat members 30 to maintain the slat members in generally parallel relation with respect to one another and, therefore, provide a flat conveying surface.

To interconnect the respective slat members 30 to form an endless conveying member and move the same with respect to the frame 4, the drive mechanism 16 is provided which includes at least one, but preferably a pair of flexible drive elements 52 and 53 (FIGS. 2 and 4) which may be supported in driving relation at one end by a drive unit 55 and at the other end by a driven or follower unit 56 (FIG. 1). The drive unit 55 and follower unit 56 are essentially identical and each may include a pair of drive members, such as sprockets 63 and 64 (FIGS. 3 and 4) having a plurality of teeth 62 thereon, which are adapted for interlocking driving engagement with the respective drive elements 52 and 53 to move the same lengthwise of the frame. As shown, the sprockets 63 and 64 are keyed to a common shaft 66 which is journaled for rotation in support bearings 68 and 69. The bearings 68 and 69 may be disposed outwardly of the sprocket members and mounted, such as on plates 71 and 72, which may be secured to the frame 4 in any suitable manner, such as by bolts or the like. A suitable power means, such as an electric motor (not shown) may be connected in driving relation to the shaft 66 in a manner well known in the art to actuate the conveyor apparatus.

The follower unit 56 is generally identical to the drive unit 55 with the exception that a means for adjusting the tension of the drive elements 52 and 53 is provided. That is, the support plates, only one shown at 73, on which the follower unit is mounted may be made long enough to allow the unit to be shifted toward or away from the drive unit 55. A suitable fastening means, such as at 70, may be provided to hold the follower unit in a fixed position. By this arrangement, the unit 56 may be fixedly adjusted on the support 73 for imparting and maintaining the proper tension on the drive elements 52 and 53, as desired.

Preferably, each of the drive elements 52 and 53 comprise chains of the type No. 658 as manufactured by the Link Belt Company of Chicago, Illinois. Referring again to FIGS. 2 and 3, each of the drive elements, such as 52, may include a single link member 74 and double link member 75 which are pivotally connected to one another at the opposed ends by common pins, as at 76. As shown, the single link member 74 is centrally disposed between the respective links 77 and 78 of the double link member 75 to hold the same in spaced relation defining an opening 79 which is adapted to receive a respective one of the teeth 62 of the sprocket member 63 in driving relation therein.

Referring to FIG. 4, the drive elements 52 and 53 are preferably connected to the respective slat members 30 by means of oppositely disposed bracketlike members 80 which may be attached to the interior side 38 thereof. As shown, the bracket members 80 may be generally L-shaped in configuration and preferably each comprise a short angle iron section 82 having a pair of perpendicularly disposed flange portions 83 and 84. Preferably, the angle sections 82 may be attached to the slat members 30 in any suitable manner, such as by welding or the like, with one of the flange portions 83 extending generally perpendicularly thereto while the other flange portion 84 extends in a direction outwardly toward the side of the conveyor. In the preferred form, each of the respective single link 74 and double link 75 members are mounted on generally flat plates, such as at 85, which are adapted for detachable connection to the outward projecting flanges 84, such as by suitable fasteners, as at 86. By this arrangement, a respective one of the slat members 30 may be connected to a pair of single or a pair of double link members. Preferably, each of the plates 85 extends generally parallel in spaced apart relation with respect to the interior side 38 of an associated slat member 30 having their outer marginal edges 88 projecting beyond the outer marginal edges 89 of the outwardly projecting flanges 84, but spaced slightly inwardly of the outer marginal edges 90 of the respective slat members. By this arrangement, the plates 85 and the associated slat members 30 together define an outwardly opening slot 91 which extends in uninterrupted relation around the opposed edges of the conveyor member 6. As can be seen, by this arrangement the entire weight of the slat members 30 and the articles carried thereon will be supported entirely by the roller members 42 with little of the weight being carried by drive elements 52 and 53. In addition, the opposed ends of the slat members 30 will overlie the respective drive elements 52 and 53 providing a protective cover therefor and enabling utilization of the full width of the frame 4. Referring again to FIG. 1, the angle section 82 and plates 85 may extend widthwise across the slat members 30 between the leading and trailing edges 34 and 36 thereof and preferably, have a lengthwise dimension, such as at $c$, which is less than or equal to the widthwise dimension of the slat member. In addition, the widthwise dimension of the respective slat members is preferably slightly less, such as 1/16 inch, than the transverse distance between the central axis of the respective pin members 76 so that the respective confronting leading 34 and trailing 36 edges of the slat members may be disposed in closely spaced relation so as to prevent smaller objects from passing therebetween.

Referring again to FIGS. 4 and 5, the slide support means 14 is provided to support the respective slat members 30 as they move along the inner reach 10, and preferably includes a pair of oppositely disposed lower lengthwise extending rail members 92 and 93. The rail members 92 and 93 are preferably L-shaped in configuration, and may be made of any suitable material, such as angle irons or the like. As shown, the rail members 92 and 93 may be disposed adjacent the opposed side walls of the frame 4 in generally vertically aligned relation with respect to the respective drive elements 52 and 53, and may be affixed to the posts 24 by suitable fasteners 94, such as by rivets or the like. Preferably, each of the rail members includes an inwardly projecting support flange 95 on which is mounted, such as by an adhesive or the like, a substantially friction-free bearing member 96 adapted to slidably engage the respective plate members 85 as the slat members 30 move along the inner reach 10. The members 96 are preferably made of a good antifriction and wear resistant material, such as Nylatron or the like.

As shown in FIG. 1, each of the rail members, such as 92, terminate at their opposed distal ends 97 and 98 in generally vertical alignment with the axis of rotation of the respective sprockets, such as at 63, of the drive unit 55 and follower unit 56 to provide clearance for the slat members 30 as they move between the inner 10 and outer reach 12, and vice versa. In addition, as shown in FIG. 5, the transverse distance between each bearing member 96 adjacent the distal ends, such as at 97, is preferably approximately equal to the transverse distance between the confronting faces 95 of the respective plate members 85 when the associated drive element 52 is in engaged relation with the sprockets 63. By this arrangement, the bearing members 96 will extend generally linearly between and in tangential relation to the sprockets 63 so that the confronting surfaces 95 of the respective plates 85 will smoothly engage the bearing members 96. In addition, by supporting the inner reach in this manner, the pull on the drive and follower shafts is greatly reduced, as well as the construction and operating costs of the conveyor apparatus.

We claim:
1. In a conveyor apparatus comprising,
a frame,
a conveyor member mounted on said frame including a plurality of slat members disposed in endless side-by-side relation and defining inner and outer reach portions,
a drive mechanism including a pair of endless, flexible drive elements mounted adjacent the opposed ends of said slat members,
said slat members extending in overlying relation with respect to said drive elements along said outer reach portion,
said drive mechanism including spaced sprocket members disposed for driving engagement with said drive elements for driving said conveyor member lengthwise of said frame, roller support means mounted on said frame disposed between opposed ends of said slat members,
a plurality of elongated roller members journaled for rotation on said roller support means and having their axes of rotation disposed generally parallel to the lengthwise dimension of said slat members,
said drive elements being disposed inwardly from said frame and outwardly from the opposed ends of said roller members along said outer reach portion, slide support means carried by said frame and disposed inwardly of said outer reach portion for slidably supporting said inner reach portion, and
said slat member defining said outer reach portion rollingly engaging said roller members for movement lengthwise of said frame and relative to said roller members for minimizing the loading on said drive mechanism.

2. In a conveyor apparatus in accordance with claim 1, wherein
said drive element is disposed in spaced relation from said slat members, and
said slide support means is disposed between said drive element and said slat members for supporting the respective slat members of said inner reach portion in suspended relation with respect to said frame.

3. In a conveyor apparatus in accordance with claim 1, wherein
each of said slat members is operably connected to said drive element by a bracketlike member, and said bracketlike member includes an outwardly projecting plate member which is disposed for sliding engagement with said slide support means for supporting the respective slat members of said inner reach portion in suspended relation with respect to said frame.

4. In a conveyor apparatus in accordance with claim 3, wherein
each of said bracketlike members includes a flange portion projecting outwardly from the respective plate member and attached adjacent its free end to a respective one of said slat members, and
said slide support means slidably supports the respective plate members adjacent the ends remote from said flange portion.

5. In a conveyor apparatus in accordance with claim 1, wherein
said drive element comprises a looplike chain member having a plurality of link members interconnected to one another at their opposed ends by common pin members, and
said drive mechanism includes spaced sprocket members disposed for driving engagement with said chain member for driving said conveyor member lengthwise of said frame.

6. In a conveyor apparatus in accordance with claim 1, wherein
said drive element includes a plurality of link members interconnected by spaced pin members, and wherein
the spacing between the axes of the respective pin members corresponds substantially to the width of the respective slat members whereby the adjacent edges of said slat members are disposed in close proximity to one another as they move along the inner and outer reach portions.

7. In a conveyor apparatus in accordance with claim 1, wherein
each of the respective of said slat members is operably connected to said drive element by a bracketlike member,
said bracketlike member including an outwardly projecting plate member detachably connected thereto, and
said drive element being connected to said plate member and supported in suspended relation from said slat members adjacent said outer reach portion.

8. In a conveyor apparatus in accordance with claim 1, wherein
said slide support means includes at least one raillike member mounted on said frame between said inner and outer reach portions, and
a bearing member is carried by said raillike member for slidably supporting said drive element thereon.

* * * * *